(12) United States Patent
Kim et al.

(10) Patent No.: US 10,318,275 B2
(45) Date of Patent: Jun. 11, 2019

(54) SOFTWARE UPDATE APPARATUS AND METHOD IN VIRTUALIZED ENVIRONMENT

(71) Applicant: ELECTRONICS AND TELECOMMUNICATIONS RESEARCH INSTITUTE, Daejeon (KR)

(72) Inventors: Sung-Jin Kim, Daejeon (KR); Woomin Hwang, Daejeon (KR); Byung-Joon Kim, Daejeon (KR); Hyun-Yi Yi, Incheon (KR); Chul-Woo Lee, Daejeon (KR); Hyoung-Chun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 15/656,206

(22) Filed: Jul. 21, 2017

(65) Prior Publication Data
US 2018/0246710 A1    Aug. 30, 2018

(30) Foreign Application Priority Data

Feb. 27, 2017    (KR) .................. 10-2017-0025478

(51) Int. Cl.
| G06F 8/65 | (2018.01) |
| G06F 9/455 | (2018.01) |
| G06F 9/4401 | (2018.01) |

(52) U.S. Cl.
CPC .............. *G06F 8/65* (2013.01); *G06F 9/4406* (2013.01); *G06F 9/45558* (2013.01); *G06F 2009/45579* (2013.01); *G06F 2009/45591* (2013.01)

(58) Field of Classification Search
CPC ...... G06F 8/65; G06F 9/4406; G06F 9/45558; G06F 2009/45591

(Continued)

(56) References Cited

U.S. PATENT DOCUMENTS

| 6,711,572 B2 * | 3/2004 | Zakharov ........... G06F 17/30144 717/170 |
| 8,205,194 B2 * | 6/2012 | Fries ................... G06F 8/65 717/168 |

(Continued)

FOREIGN PATENT DOCUMENTS

| FR | 2885429 A1 * | 11/2006 | ............... G06F 8/65 |
| JP | 2008-084029 A | 4/2008 | |
| KR | 10-0883208 B1 | 2/2009 | |

OTHER PUBLICATIONS

Jin et al., "A guest-transparent file integrity monitoring method in virtualization environment", 2010, Elsevier Ltd. (Year: 2010).*

(Continued)

*Primary Examiner* — Wei Y Zhen
*Assistant Examiner* — Junchun Wu
(74) *Attorney, Agent, or Firm* — LRK Patent Law Firm (57) ABSTRACT

A software update apparatus and method in a virtualized environment. The software update method performed by a software update apparatus in a virtualized environment includes monitoring an operation that is invoked when software is updated in a guest operating system area, creating a software profile by analyzing results of the monitoring, mounting a virtual disk image for a target virtual machine in a target directory in a virtual machine monitor area, and incorporating update information of at least one of a file and a registry that are specified in the software profile into the target directory in which the virtual disk image is mounted.

16 Claims, 9 Drawing Sheets

(58) Field of Classification Search
USPC .......................................................... 717/169
See application file for complete search history.

(56) References Cited

U.S. PATENT DOCUMENTS

| | | | | |
|---|---|---|---|---|
| 9,009,696 | B2* | 4/2015 | Vidal | G06F 8/65 717/169 |
| 9,275,172 | B2* | 3/2016 | Ostermeyer | G06F 17/5009 |
| 9,495,193 | B2* | 11/2016 | Doherty | G06F 11/30 |
| 9,690,562 | B2* | 6/2017 | Vidal | G06F 8/65 |
| 9,858,105 | B1* | 1/2018 | Upadhyay | G06F 9/45558 |
| 2004/0255179 | A1* | 12/2004 | Mayer | G06F 9/4406 714/1 |
| 2007/0250817 | A1* | 10/2007 | Boney | G06F 21/56 717/124 |
| 2007/0261045 | A1* | 11/2007 | Gujarathi | G06F 8/65 717/168 |
| 2008/0127162 | A1* | 5/2008 | Xu | G06F 9/44505 717/168 |
| 2009/0007105 | A1* | 1/2009 | Fries | G06F 8/65 718/1 |
| 2011/0072254 | A1* | 3/2011 | Kuang | G06F 9/4403 717/168 |
| 2011/0214112 | A1* | 9/2011 | Vidal | G06F 8/65 717/168 |
| 2012/0246645 | A1* | 9/2012 | Iikura | G06F 8/61 718/1 |
| 2013/0132942 | A1 | 5/2013 | Wang | |
| 2015/0378762 | A1* | 12/2015 | Saladi | H04L 41/0816 718/1 |
| 2016/0048407 | A1* | 2/2016 | Alicherry | H04L 43/08 718/1 |
| 2016/0098288 | A1* | 4/2016 | Petrov | G06F 9/45558 718/1 |
| 2017/0109190 | A1* | 4/2017 | Sha | G06F 9/45558 |
| 2017/0235563 | A1* | 8/2017 | Bafna | G06F 8/65 718/1 |
| 2018/0136961 | A1* | 5/2018 | Liguori | G06F 8/65 |
| 2018/0157522 | A1* | 6/2018 | Bafna | G06F 9/45558 |
| 2018/0159729 | A1* | 6/2018 | Deshmukh | H04L 61/1511 |

OTHER PUBLICATIONS

Chen et al., "Virtual Disk Image Reclamation for Software Updates in Virtual Machine Environments", 2009, IEEE (Year: 2009).*
Mergen et al., "Virtualization for High-Performance Computing", Apr. 2006, ACM, vol. 40, Issue 2 (Year: 2006).*
Fang et al., "VMGuard: An Integrity Monitoring System for Management Virtual Machines", 2010, IEEE (Year: 2010).*
Kang Fan et al., "OPS: Offline Patching System for the Images Management in a Secure Cloud Environment," IEEE 10th International Conference on Services Computing (SCC), 2013.
Bryan D. Payne et al., "Secure and Flexible Monitoring of Virtual Machines," 23rd Annual Computer Security Applications Conference, Oct. 2007, pp. 385-397.

* cited by examiner

SOFTWARE PROFILE 400

RECORD 1 (410)

| SOFTWARE NAME | PROFILE ATTRIBUTE | PROCESS ID | PROCESS NAME | TIME | OPERATION | PATH NAME | PERFORMANCE RESULT | DETAILED PARAMETER | CREATED FILE |
|---|---|---|---|---|---|---|---|---|---|
| KB2506014 | INSTALL | 2100 | TrustedInstaller.exe | 2016.07.09 22:00:00.000 | IRP_MJ_WRITE | C:/windows/system32/aaa.dll | SUCCESS | Offset: 0, Lenght: 4, ... | File aaa.dll |

RECORD 2 (420)

| SOFTWARE NAME | PROFILE ATTRIBUTE | PROCESS ID | PROCESS NAME | TIME | OPERATION | PATH NAME | PERFORMANCE RESULT | DETAILED PARAMETER |
|---|---|---|---|---|---|---|---|---|
| KB2506014 | INSTALL | 2100 | TrustedInstaller.exe | 2016.07.09 22:00:00.000 | RegCreateKey | HKLM/SYSTEM/AAA | SUCCESS | Disposition: REG_CREATE_KEY, ... |

SOFTWARE UPDATE APPARATUS AND METHOD IN VIRTUALIZED ENVIRONMENT

CROSS REFERENCE TO RELATED APPLICATION

This application claims the benefit of Korean Patent Application No. 10-2017-0025478, filed Feb. 27, 2017, which is hereby incorporated by reference in its entirety into this application.

BACKGROUND OF THE INVENTION

1. Technical Field

The present invention relates generally to technology for updating software in a virtualized environment and, more particularly, to technology for creating a software profile in a cloud virtualized environment, and updating software by applying the created software profile to the software.

2. Description of the Related Art

In order to protect a process from unauthorized modification or access, a computer system has a total of four hierarchical protection domains ranging from Ring 0 to Ring 3.

Protection domains are intended to define the levels of privileges to access computer system resources, wherein a user area is defined as Ring 3 (the lowest privilege level) and a kernel area is defined as Ring 0 (the highest privilege level). Accordingly, in order to use computer system resources in the user area, access to system resources must be requested from the kernel area.

In a virtualized environment, there is a logical platform layer called a hypervisor or a virtual machine monitor in order for a host computer to simultaneously run a plurality of guest operating systems. The corresponding logical platform layer logically has Ring-1, that is, a new highest privilege level, in the protection domain of a computer system. Therefore, even if the kernel of a guest operating system having a privilege level of Ring 0 is defeated by malicious code, it is impossible to access the context of a virtual machine monitor having a privilege level of Ring-1 depending on the system structure.

By utilizing the characteristics of a virtual machine monitor area, a scheme for monitoring security events of a guest operating system in the virtual machine monitor area or performing tasks of a guest operating system sensitive to security in the virtual machine monitor area instead of a guest operating system area has been presented.

Meanwhile, in order to install and maintain software of a guest operating system in a cloud virtualized environment, a software installer provided by the guest operating system or a third party provider may be utilized. An operating system generally includes a unique software installer that performs all tasks related to the addition and deletion of software, system configuration changes, and the creation of a recovery backup, and other support tools. For example, in a Windows operating system, the installation and maintenance of software may be performed locally, remotely or in a virtual machine monitor area using the internal installer of an operating system, PowerShell, and Windows Management Instrumentation (WMI) service.

Such a software installation and maintenance method may be applied to both a normal host environment and a cloud virtualized host environment. Further, there is an advantage in that a software installation and maintenance function provided by an operating system vendor may be utilized.

However, since all or some of software installers and other support tools are performed at privilege levels from Ring 0 to Ring 3 according to the classification of protection domains, all tasks performed by the corresponding software installer are exposed to a threat of malicious code having a privilege level of Ring 0.

For example, when a security update installation task for a Windows operating system is performed, a Man-in-the-Middle Attack of installing a malicious proxy agent in the operating system and then installing a malicious system driver may occur. Further, such security vulnerabilities are equally likely to appear even in a virtual machine in a cloud virtualized infrastructure environment.

Therefore, there is required the development of technology that is capable of minimizing security vulnerabilities that may occur when software update is performed in a guest operating system. In this regard, Korean Patent No. 10-0883208 (Publication Date: Feb. 13, 2009) discloses a technology related to "Mobile Communication Terminal Available to Update Software Based on Virtualization Technology and Updating Method Thereof."

SUMMARY OF THE INVENTION

Accordingly, the present invention has been made keeping in mind the above problems occurring in the prior art, and an object of the present invention is to minimize security vulnerabilities that may occur while software update is performed in a guest operating system.

In accordance with an aspect of the present invention to accomplish the above object, there is provided a software update method in a virtualized environment, performed by a software update apparatus in a virtualized environment, the software update method including monitoring an operation that is invoked when software is updated in a guest operating system area, creating a software profile by analyzing results of the monitoring, mounting a virtual disk image for a target virtual machine in a target directory in a virtual machine monitor area, and incorporating update information of at least one of a file and a registry that are specified in the software profile into the target directory in which the virtual disk image is mounted.

Monitoring the operation that is invoked may include setting a monitoring target that includes at least one of a process and an operation that are targets to be monitored, and generating log data by monitoring invocation details of the operation that is invoked when the monitoring target updates the software.

Creating the software profile may include determining whether update of the software requires a system reboot, if it is determined that the update of the software requires the system reboot, setting a process that performs a pending file rename operation as the monitoring target, performing setting such that when the system reboots, the operation that is the monitoring target is activated, and then performing the system reboot, and generating the log data by monitoring invocation details of the operation.

Creating the software profile may further include, if it is determined that the update of the software does not require the system reboot, creating source software profiles using the log data, and creating the software profile based on a list of the source software profiles.

Creating the software profile based on the list of the source software profiles may be configured to create the software profile based on an extent of influence and a degree of error that are exerted and caused when the source software profiles are applied to the target virtual machine.

Mounting the virtual disk image in the target directory may include selecting the virtual disk image for the target virtual machine to which the software profile is to be applied, setting a location of the target directory in the virtual machine monitor area, and mounting the selected virtual disk image at the location of the target directory.

Incorporating the update information into the target directory may include searching locations below the target directory, in which the virtual disk image is mounted, for a registry file using the software profile, performing a registry update by parsing the found registry file, and unmounting the virtual disk image.

The software update method may further include resetting at least one of the monitoring target, the software profile, and a location of the target directory.

Resetting the at least one of the monitoring target, the software profile, and the location of the target directory may be configured to provide an operation mode that allows mounting the virtual disk image and incorporating the update information into the target directory to be performed in at least one of a state in which a virtual machine is in a deactivated state, a state immediately before the virtual machine switches from the deactivated state to an activated state, and a state in which the virtual machine is in the activated state.

The software profile may include one or more records that include at least one of a name of the software, a name of update, an attribute of the software profile, an identifier of a process that is a monitoring target, a name of the process, a usage time of an operation that is the monitoring target, a name of the operation, a file that is capable of being acquired by parsing parameters of the operation, a path name of the registry, results of performance of the operation, detailed parameter information of the operation, an actually created file, and information of the registry.

In accordance with another aspect of the present invention to accomplish the above object, there is provided a software update apparatus in a virtualized environment, including a monitoring unit for monitoring an operation that is invoked when software is updated in a guest operating system area, a software profile creation unit for creating a software profile by analyzing results of the monitoring, a mount unit for mounting a virtual disk image for a target virtual machine in a target directory in a virtual machine monitor area, and a file control unit for incorporating update information of at least one of a file and a registry that are specified in the software profile into the target directory in which the virtual disk image is mounted.

The monitoring unit may set a monitoring target that includes at least one of a process and an operation that are targets to be monitored, and generate log data by monitoring invocation details of the operation that is invoked when the monitoring target updates the software.

The software profile creation unit may be configured to determine whether update of the software requires a system reboot, if it is determined that the update of the software requires the system reboot, set a process that performs a pending file rename operation as the monitoring target, perform setting such that when the system reboots, the operation that is the monitoring target is activated, and then perform the system reboot, and generate the log data by monitoring invocation details of the operation.

The software profile creation unit may be configured to, if it is determined that the update of the software does not require the system reboot, create source software profiles using the log data and create the software profile based on a list of the source software profiles.

The software profile creation unit may create the software profile based on an extent of influence and a degree of error that are exerted and caused when the source software profiles are applied to the target virtual machine.

The mount unit may be configured to select the virtual disk image for the target virtual machine to which the software profile is to be applied, set a location of the target directory in the virtual machine monitor area, and mount the selected virtual disk image at the location of the target directory.

The file control unit may be configured to search locations below the target directory, in which the virtual disk image is mounted, for a registry file using the software profile, perform a registry update by parsing the found registry file, and unmount the virtual disk image.

The software update apparatus may further include a management unit for resetting at least one of the monitoring target, the software profile, and a location of the target directory.

The management unit may be configured to provide an operation mode that allows at least one of the mount unit and the file control unit to be operated in at least one of a state in which a virtual machine is in a deactivated state, a state immediately before the virtual machine switches from the deactivated state to an activated state, and a state in which the virtual machine is in the activated state.

The software profile may include one or more records that include at least one of a name of the software, a name of update, an attribute of the software profile, an identifier of a process that is a monitoring target, a name of the process, a usage time of an operation that is the monitoring target, a name of the operation, a file that is capable of being acquired by parsing parameters of the operation, a path name of the registry, results of performance of the operation, detailed parameter information of the operation, an actually created file, and information of the registry.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

Figure 1:
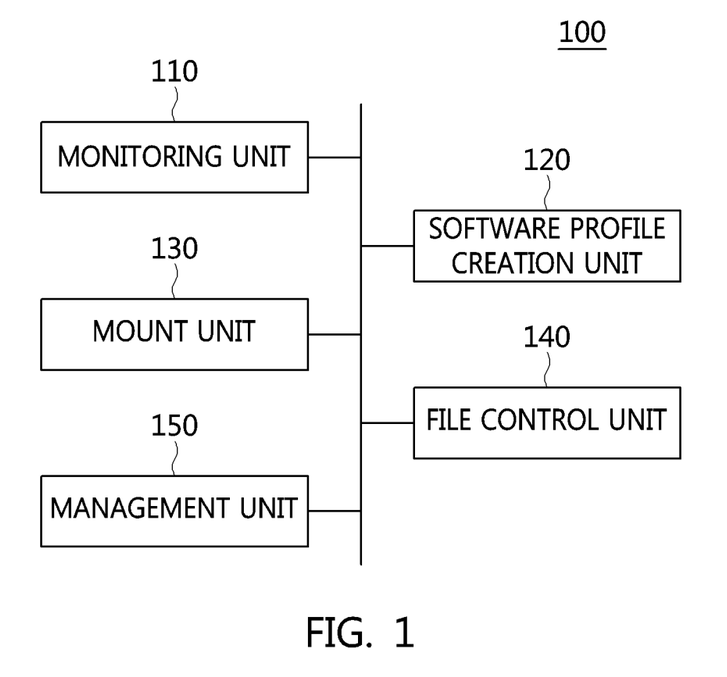
FIG. 1 is a block diagram illustrating the configuration of a software update apparatus in a virtualized environment according to an embodiment of the present invention.

FIG. 1 is a block diagram illustrating the configuration of a software update apparatus in a virtualized environment according to an embodiment of the present invention.

As shown in FIG. 1, a software update apparatus 100 in a virtualized environment performs the update of software installed in each of multiple virtual machines on a computer system functioning as a part of a virtualized environment in which multiple virtual machines are running.

The software update apparatus 100 in the virtualized environment includes a monitoring unit 110, a software profile creation unit 120, a mount unit 130, a file control unit 140, and a management unit 150.

The monitoring unit 110 monitors an operation that is invoked when software is updated in a guest operating system area.

Here, the guest operating system area means a guest operating system platform layer having privilege levels ranging from Ring 3 to Ring 0. On the other hand, a virtual machine monitor area denotes a platform layer having a privilege level of Ring-1, which is the highest privilege level logically generated by a virtual machine monitor.

Further, the monitoring unit 110 monitors the operation of a process that performs the update of software. Here, the update of software may mean an operation corresponding to at least one of tasks such as installation, deletion, and recovery backup creation of software or update.

Here, the monitoring unit 110 may set a monitoring target (the target to be monitored), may monitor the invocation details of an operation that is invoked when the monitoring target updates software, and may generate log data required for the creation of a software profile. Here, the monitoring target may include at least one of a process and an operation that are targets to be monitored.

Further, the monitoring unit 110 may include a monitoring module driver and a monitoring module controller. The monitoring module driver may receive an I/O Request Packet (IRP) operation or a callback operation from a filter driver or an Application Program Interface (API) callback routine provided by a guest operating system in a kernel area of the guest operating system, and may transfer the received operation to the monitoring module controller in a user area.

Further, the monitoring module controller may communicate with the monitoring module driver in a user area of the guest operating system, may control an operation monitoring task, and may generate log data required for the creation of a software profile with reference to the results of the monitoring.

The monitoring module controller of the monitoring unit 110 may designate the monitoring target process of the monitoring module driver, may add a separate process, invoked by the monitoring target process, to the monitoring target, and may then perform operation monitoring.

Furthermore, the monitoring unit 110 may additionally monitor the occurrence of an operation depending on the performance of a pending file rename operation when a system reboots after the software has been installed or deleted.

The monitoring unit 110 may monitor IRP_MJ_CREATE, IRP_MJ_WRITE, IRP_MJ_SET_INFORMATION, and IRP_MJ_SET_SECURITY IRP operations, which are related to the creation, change, and deletion of a file, and may then perform a monitoring task by adding or excluding the operation that is the target to be monitored.

Further, the monitoring unit 110 may monitor callback operations of RegCreateKey, RegDeleteKey, RegSetInfoKey, RegSetKeySecurity, and RegSetValue, which are related to the creation, change, and deletion of a registry, and may perform a monitoring task by adding or excluding the operation that is the target to be monitored.

Next, the software profile creation unit 120 may create a software profile by analyzing the monitoring results.

The software profile creation unit 120 may create source software profiles by analyzing the operation monitoring details of the log data and extracting an actually created file and registry information. Further, the software profile creation unit 120 may collect files actually created by each operation and registry information from a virtual disk image.

Further, the software profile creation unit 120 may store the finally created software profile in a software profile database (DB). The software profile creation unit 120 may process data in accordance with the form of records corresponding to the software profile by analyzing the monitoring details and information collected from the virtual disk image, and may store each source software profile, which is the processed data, in the software profile DB.

Further, the software profile creation unit 120 may remove source software profiles that do not greatly influence the guest operating system, i.e. an application target, or that cause serious errors, from a list of source software profiles, may change the list of source software profiles to correspond to the context of the application target guest operating system, and may then create the final software profile.

When the file path name of a record included in a source software profile indicates at least one of a file system meta area and a registry file, or when the options parameter value of an IRP_MJ_CREATE operation is 'FILE_OPENED', the software profile creation unit 120 may delete the corresponding record.

Furthermore, the software profile creation unit 120 may change a key, a sub-key, and values corresponding to the date of installation of software in a registry based on the time at which the software profile is desired to be applied to the target guest operating system, and may change a key, a sub-key, and values corresponding to system information so that the key, sub-key, and values correspond to the system information of the target guest operating system.

In addition, the software profile creation unit 120 may determine whether the update of software requires a system reboot.

If it is determined that the corresponding update requires the system reboot, the software profile creation unit 120 sets a process that performs a pending file rename operation as the monitoring target. Further, the software profile creation unit 120 performs setting so that, when the system reboots, the operation that is the monitoring target is activated, and then reboots the system. Furthermore, the software profile creation unit 120 may generate log data by monitoring the invocation details of the operation.

On the other hand, if it is determined that the corresponding update does not require the system reboot, the software profile creation unit 120 may create source software profiles using the log data, and may create a software profile based on the list of the source software profiles.

Here, the software profile creation unit 120 may create the software profile based on the extent of influence and the degree of error that are exerted and caused when the source software profiles are applied to a target virtual machine.

Next, the mount unit 130 may mount a virtual disk image for the target virtual machine in a target directory in the virtual machine monitor area.

The mount unit 130 may mount a virtual disk image for a virtual machine to which the software profile is desired to be applied in a specific directory of the virtual machine monitor area. Here, the mount unit 130 may select a virtual disk image for the target virtual machine to which the software profile is to be applied, and may set the location of the target directory in the virtual machine monitor area. Further, the mount unit 130 may mount the selected virtual disk image at the location of the target directory.

Here, the virtual disk image may mean a virtual disk image file having an extension such as img, qcow2, vhd, vmdk, ova, or ovf. Also, the virtual disk image file may contain file system information such as extended (ext) 2/3/4, File Allocation Table (FAT), or New Technology File System (NTFS) information.

The mount unit 130 may parse the format of the virtual disk image and a file system contained in the corresponding image format, thus structurizing the internal directory and file information of the file system. Further, the mount unit 130 may access the structurized information or may perform update such as creating a new directory and file or changing or deleting the created directory and file.

Furthermore, the mount unit 130 may be configured in the form of either standalone software of a system in the virtual machine monitor area or client-server software connected to the system in the virtual machine monitor area over a network.

Next, the file control unit 140 may incorporate update information of at least one of the file and registry specified in the software profile into the target directory in which the virtual disk image is mounted.

The file control unit 140 may access the target directory and perform a software update task by referring to the software profile. That is, the file control unit 140 may access the target directory and may perform a software update task corresponding to at least one of a software or update installation task, a software or update deletion task, and a recovery backup creation task.

Further, the file control unit 140 may search locations below the target directory, in which the virtual disk image is mounted, for a registry file using the software profile. Furthermore, the file control unit 140 may perform a registry update by parsing the found registry file, and may unmount the virtual disk image.

Here, the file control unit 140 may perform the task of creating, changing or deleting a registry key, a sub-key and values based on the software profile by analyzing the file structure of the found registry file.

When, in a record included in the software profile, an item for the type of an operation is IRP_MJ_CREATE, an item for the performance result of the operation is "SUCCESS", and the option value of an item for the detailed parameter information of the operation is "Directory", the file control unit 140 may create a directory described in the file path name item of the corresponding record in the same relative path below a target directory.

Further, when, in a record included in the software profile, an item for the type of an operation is IRP_MJ_CREATE, an item for the performance result of the operation is SUCCESS and the option value of an item for the detailed parameter information of the operation is FILE_DELETE_ON_CLOSE, the file control unit 140 may delete a file described in the file path name item of the corresponding record from the same relative path below a target directory.

Furthermore, when, in a record included in the software profile, an item for the type of an operation is IRP_MJ_WRITE and an item for the performance result of the operation is SUCCESS, the file control unit 140 may create a file described in the file path name item of the corresponding record in the same relative path below a target directory.

Furthermore, when, in a record contained in the software profile, an item for the type of an operation is IRP_MJ_SET_SECURITY and an item for the performance result of the operation is SUCCESS, the file control unit 140 may change the security attribute information of a file present in the same relative path below a target directory by referring to a file described in the file path name item of the corresponding record and file security attribute information described in the detailed parameter item of the operation.

In addition, the file control unit 140 may search for a registry file and may perform a software update task by referring to the software profile. When, in a record included in the software profile, an item for the type of an operation is RegCreateKey, an item for the performance result of the operation is SUCCESS, and the disposition value of an item for the detailed parameter information of the operation is REG_CREATED_NEW_KEY, the file control unit 140 may create a key or a sub-key, described in the registry path name item of the corresponding record, in the same registry path of a target guest operating system.

Further, when, in a record included in the software profile, an item for the type of an operation is RegSetValue, the file control unit 140 may create a value, described in the registry path name item of the corresponding record, in the same registry path of a target guest operating system.

Furthermore, when, in a record included in the software profile, an item for the type of an operation is RegDeleteKey and an item for the performance result of the operation is SUCCESS, the file control unit 140 may delete a key or a sub-key, described in the registry path name item of the corresponding record, and a value, contained in the corresponding key, from the registry of a target guest operating system.

Finally, the management unit 150 controls the operations and settings of the software update apparatus 100 in the virtualized environment.

The management unit 150 may reset at least one of the monitoring target, the software profile, and the location of the target directory. During the procedure for creating the software profile, the management unit 150 may add or delete a monitoring target including at least one of a process and an operation that are desired to be monitored.

Further, during the procedure for creating the software profile, the management unit 150 may add or delete items for records constituting the software profile. In addition, during the procedure for applying the software profile, the management unit 150 may establish a mount path of a virtual disk image.

Furthermore, the management unit 150 may locally or remotely control the operations of the components of the software update apparatus 100 in the virtualized environment and setting information related to the operations. In addition, the management unit 150 may provide an external control interface so that an operation mode is locally or remotely set.

The management unit 150 may provide an operation mode including at least one of the state in which a virtual machine is in a deactivated state, the state immediately before the virtual machine switches from the deactivated state to an activated state, and the state in which the virtual machine is in the activated state, and may control the operations and settings of the software update apparatus 100 in the virtualized environment to correspond to the operation mode.

Hereinafter, a software update method in a virtualized environment, performed by the software update apparatus in the virtualized environment, according to an embodiment of the present invention will be described in detail with reference to FIGS. 2 to 7.

Figure 2:
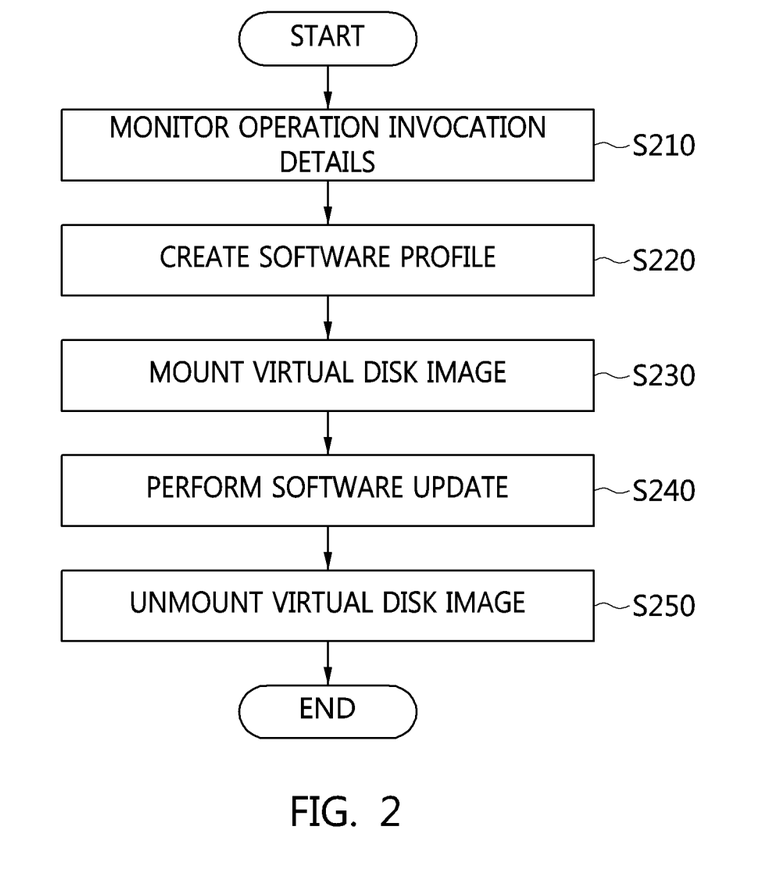
FIG. 2 is a flowchart for explaining a software update method in a virtualized environment according to an embodiment of the present invention.

FIG. 2 is a flowchart for explaining a software update method in a virtualized environment according to an embodiment of the present invention.

First, the software update apparatus 100 in the virtualized environment monitors invocation details of an operation at step S210.

In detail, the software update apparatus 100 in the virtualized environment monitors an operation that is invoked when software is updated in a guest operating system area.

Here, the software update apparatus 100 in the virtualized environment may set a target to be monitored (a monitoring target), and may generate log data by monitoring invocation details of an operation that is invoked when the monitoring target updates software. Here, the monitoring target may include at least one of a process and an operation that are the targets to be monitored.

Although the software update apparatus 100 in the virtualized environment has been described as setting the monitoring target at step S210 for the convenience of description, the present invention is not limited thereto, and the software update apparatus 100 in the virtualized environment may perform the operation of adding or excluding at least one of the process and the operation that are desired to be monitored during the procedure for performing steps S220 to S240, which will be described later.

Further, the software update apparatus 100 in the virtualized environment creates a software profile at step S220.

The software update apparatus 100 in the virtualized environment analyzes the results of the monitoring performed at step S210 and then creates the software profile.

The software update apparatus 100 in the virtualized environment may determine whether the update of software requires a system reboot and may set a process for performing a pending file rename operation as the monitoring target if it is determined that the update of the software requires the system reboot.

Further, the software update apparatus 100 in the virtualized environment performs setting such that, when the system reboots, the operation that is the target to be monitored is activated, and then performs a system reboot. When the system reboots, the software update apparatus 100 in the virtualized environment may return to and perform again step S210 of generating log data by monitoring the invocation details of the operation.

On the other hand, if it is determined that the update of the software does not require the system reboot, the software update apparatus 100 in the virtualized environment creates source software profiles using the log data. Further, the software update apparatus 100 in the virtualized environment may create the final software profile based on a list of the source software profiles.

In this case, the software update apparatus 100 in the virtualized environment may create the software profile based on the extent of influence and the degree of error that are exerted and caused when the source software profiles are applied to a target virtual machine.

Although the software update apparatus 100 in the virtualized environment has been described as creating the software profile at step S220 for the convenience of description, the present invention is not limited thereto, and the software update apparatus 100 in the virtualized environment may add or exclude items for records constituting the software profile during the procedure for performing steps S230 and S240, which will be described later.

A procedure in which the software update apparatus 100 in the virtualized environment monitors operation invocation details and creates a software profile will be described later in greater detail with reference to FIG. 3.

Next, the software update apparatus 100 in the virtualized environment mounts a virtual disk image at step S230.

The software update apparatus 100 in the virtualized environment mounts a virtual disk image for a target virtual machine in a target directory in a virtual machine monitor area. Here, the software update apparatus 100 in the virtualized environment may select a virtual disk image for a target virtual machine to which the software profile is to be applied.

Further, the software update apparatus 100 in the virtualized environment may set the location of the target directory in the virtual machine monitor area, and may mount the selected virtual disk image at the location of the target directory.

Thereafter, the software update apparatus 100 in the virtualized environment performs software update at step S240.

The software update apparatus 100 in the virtualized environment may perform software update by incorporating update information of at least one of a file and a registry specified in the software profile into the target directory in which the virtual disk image is mounted.

The software update apparatus 100 in the virtualized environment may perform a software update task by accessing the target directory in which the virtual disk image is mounted and referring to the software profile.

Further, the software update apparatus 100 in the virtualized environment may search locations below the target directory for a registry file using the software profile. Furthermore, the software update apparatus 100 in the virtualized environment may perform a registry update by parsing the found registry file.

Finally, the software update apparatus 100 in the virtualized environment, having completed its update, unmounts the virtual disk image at step S250.

The procedure in which the software update apparatus 100 in the virtualized environment mounts the virtual disk image, incorporates the update information, and unmounts the virtual disk image will be described later in greater detail with reference to FIG. 7.

Hereinafter, a software profile creation procedure performed by the software update apparatus in the virtualized environment according to an embodiment of the present invention will be described in detail with reference to FIGS. 3 and 4.

Figure 3:
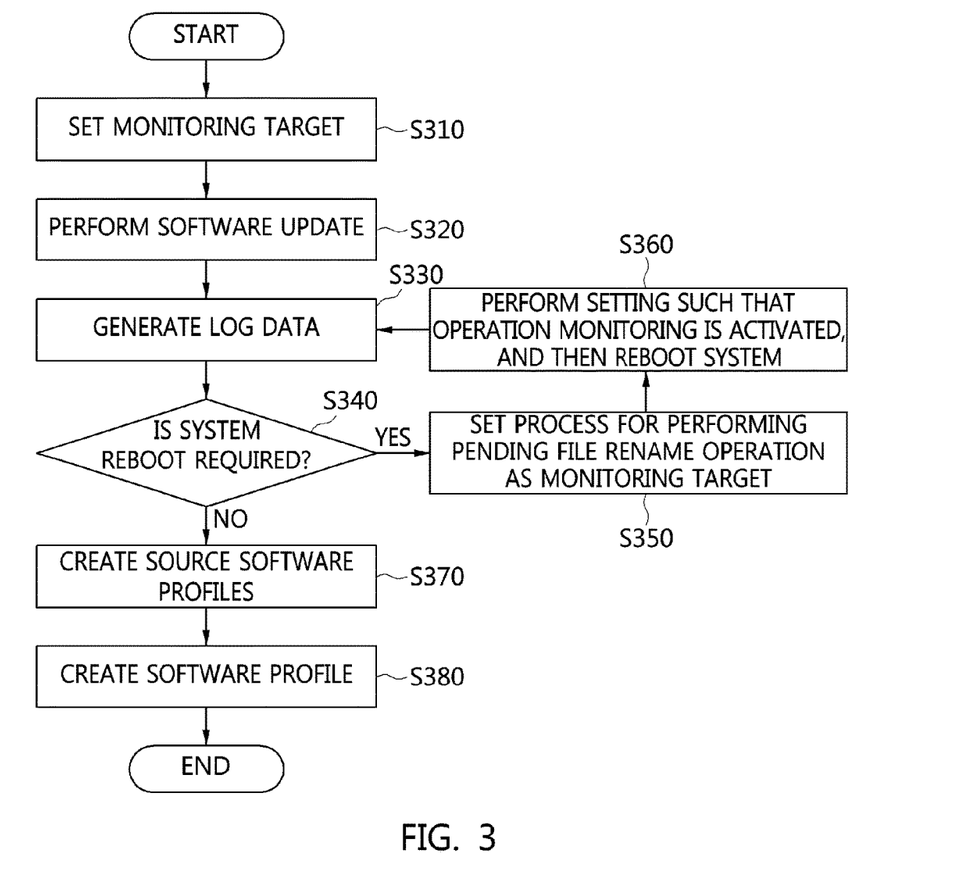
FIG. 3 is a flowchart for explaining a software profile creation procedure according to an embodiment of the present invention.

FIG. 3 is a flowchart for explaining a software profile creation procedure according to an embodiment of the present invention.

First, the software update apparatus 100 in the virtualized environment sets a monitoring target at step S310.

The software update apparatus 100 in the virtualized environment may set one or more monitoring target processes for performing a software update task and one or more monitoring target operations in a profile-only guest operating system area.

Here, the types and versions of the profile-only guest operating system and the target guest operating system to which the software profile is desired to be applied may be identical.

Further, the software update apparatus 100 in the virtualized environment performs software update at step S320.

The software update apparatus 100 in the virtualized environment may start monitoring by running software update including an operation corresponding to at least one of the installation, deletion, and recovery backup creation of software or update.

Next, the software update apparatus 100 in the virtualized environment generates log data at step S330.

The software update apparatus 100 in the virtualized environment may monitor the invocation details of an operation that occurs while the monitoring target process runs software update, and may then generate log data.

Thereafter, the software update apparatus 100 in the virtualized environment determines whether the software update requires a system reboot at step S340.

If it is determined that the software update requires the system reboot, the software update apparatus 100 in the virtualized environment sets a process for performing a pending file rename operation as the monitoring target at step S350.

Here, the pending file rename operation may denote a set of operations, the actual performance times of which depend on a subsequent boot time.

Next, the software update apparatus 100 in the virtualized environment performs setting such that operation monitoring is activated, and then performs a system reboot at step S360.

After setting the process for performing the pending file rename operation as the monitoring target, the software update apparatus 100 in the virtualized environment may perform setting such that operation monitoring is activated during a boot procedure, and may then perform a system reboot.

After performing the system reboot, the software update apparatus 100 in the virtualized environment may again perform step S330 of generating log data.

On the other hand, if it is determined that the software update does not require the system reboot, the software update apparatus 100 in the virtualized environment creates source software profiles at step S370 and creates the final software profile based on a list of the source software profiles at step S380.

The software update apparatus 100 in the virtualized environment may create each source software profile by processing the generated log data, may extract the created file during the software update procedure, and may add the extracted file to the items of source software profiles. Further, the software update apparatus 100 in the virtualized environment creates the final software profile by changing the list of the source software profiles.

Here, the final software profile may mean a software profile for installing and deleting software and update for a guest operating system.

Figure 4:
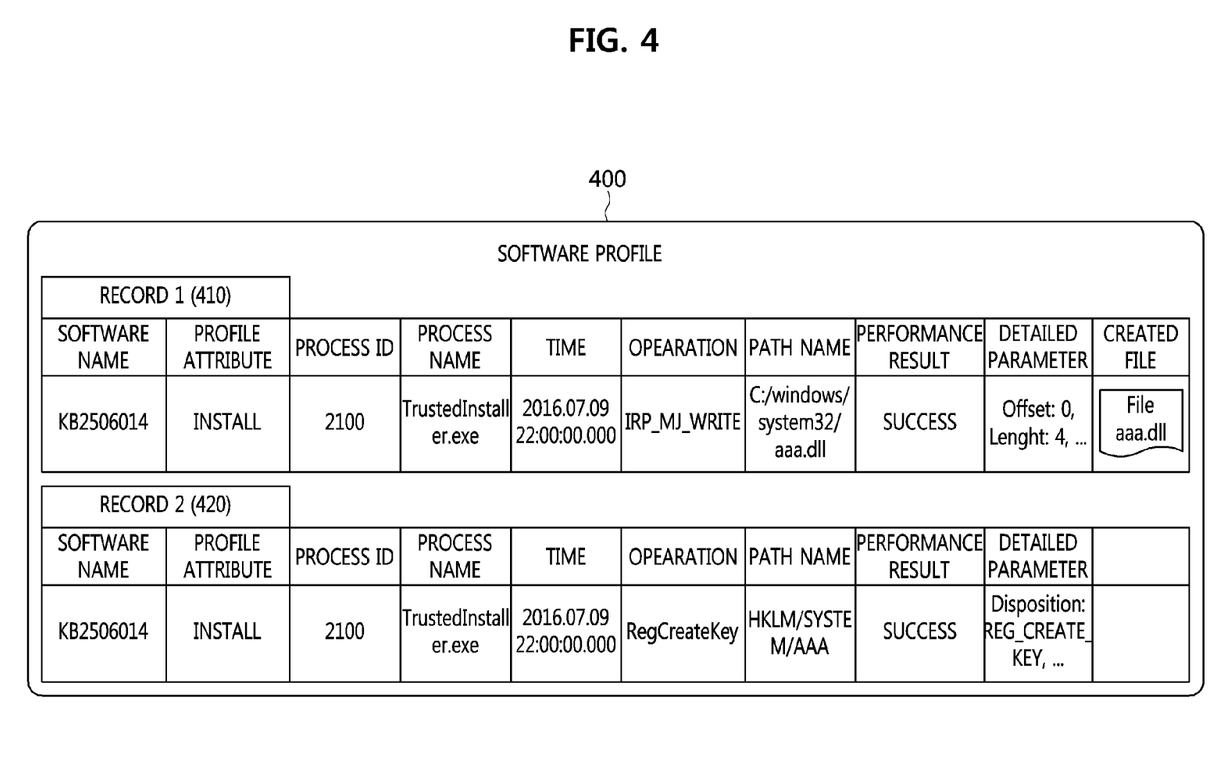
FIG. 4 is an exemplary diagram for explaining the configuration of a software profile according to an embodiment of the present invention.

FIG. 4 is an exemplary diagram for explaining the configuration of a software profile according to an embodiment of the present invention.

As shown in FIG. 4, a software profile 400 may include one or more records 410 and 420.

Further, each of the records 410 and 420 may be composed of items such as the name of software, the name of update, the attribute of a software profile, the identifier of a process that is a monitoring target, the name of the process, usage time of an operation that is a monitoring target, the name of the operation, a file that can be acquired by parsing parameters of the operation, the path name of a registry, the results of performance of the operation, detailed parameter information of the operation, an actually created file, and information of the registry.

Here, the attribute item of the software profile may be divided into items for installation, deletion, and recovery backup creation.

The first record 410 of FIG. 4 includes detailed monitoring contents related to an IRP_MJ_WRITE operation occurring when a TrustedInstaller.exe process for performing installation is monitored during a procedure for installing an update component named "KB2506014".

Further, the second record 420 includes detailed monitoring contents related to a RegCreateKey operation occurring when a TrustedInstaller.exe process for performing installation is monitored during a procedure for installing an update component named "KB2506014".

Further, the software update apparatus 100 in the virtualized environment may create the final software profile based on the list of the source software profiles created at step S370.

Here, the software update apparatus 100 in the virtualized environment may create the software profile based on the extent of influence and the degree of error that are exerted and caused when the source software profiles are applied to a target virtual machine. In particular, the software update apparatus 100 in the virtualized environment may remove a record that does not exert great influence or a record that causes serious error when the source software profiles are applied to the target virtual machine, may change the contents of the record to correspond to the context of the guest operating system, i.e. an application target, and may finally create the software profile.

Hereinafter, the procedure in which the software update apparatus in the virtualized environment according to an embodiment of the present invention monitors an operation will be described in greater detail with reference to FIGS. 5 and 6.

Figure 5:
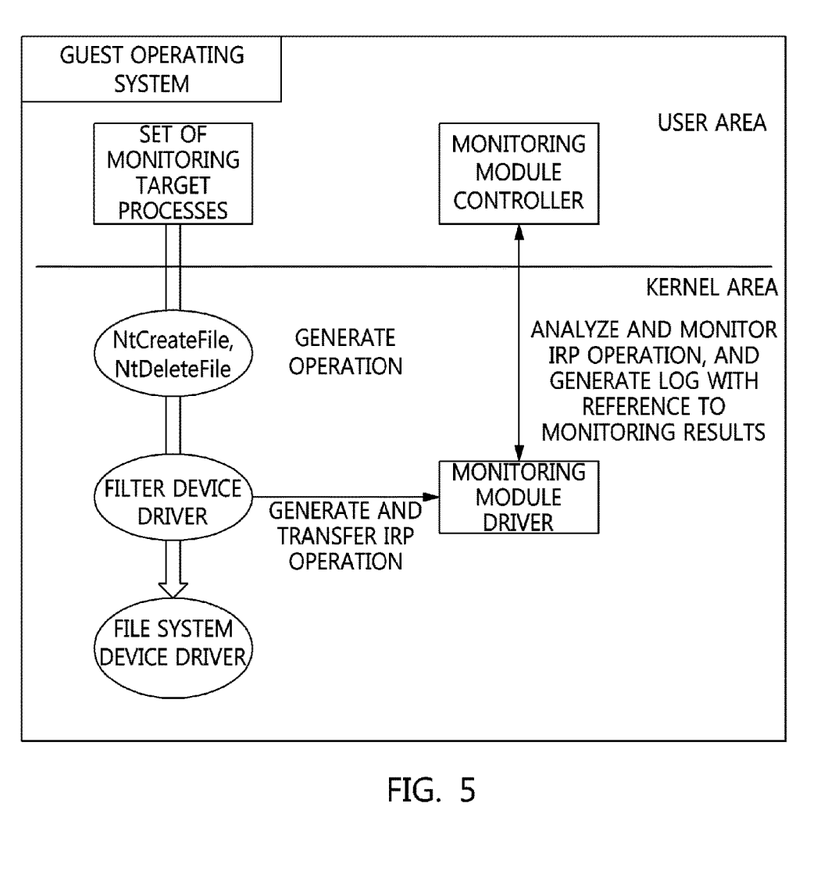
FIG. 5 is an exemplary diagram for explaining a procedure for monitoring an Integration Reference Point (IRP)-related operation at step S330 of FIG. 3.

FIG. 5 is an exemplary diagram for explaining the procedure for monitoring an IRP-related operation at step S330 of FIG. 3.

As shown in FIG. 5, when a monitoring unit (monitoring module) monitors an IRP-related operation (IRP operation) in a profile-only guest operating system, if a set of monitoring target processes generates operations, such as NtCreateFile and NtDeleteFile, the software update apparatus 100 in the virtualized environment may transfer an IRP request to a file system device driver.

In this case, a filter device driver registered in the guest operating system may intercept the IRP operation and may transfer it to the monitoring module driver. Further, the monitoring module driver may additionally transfer the received IRP operation to a monitoring module controller in a user area, and may analyze the parameters of the IRP operation, thus creating source software profile data.

Figure 6:
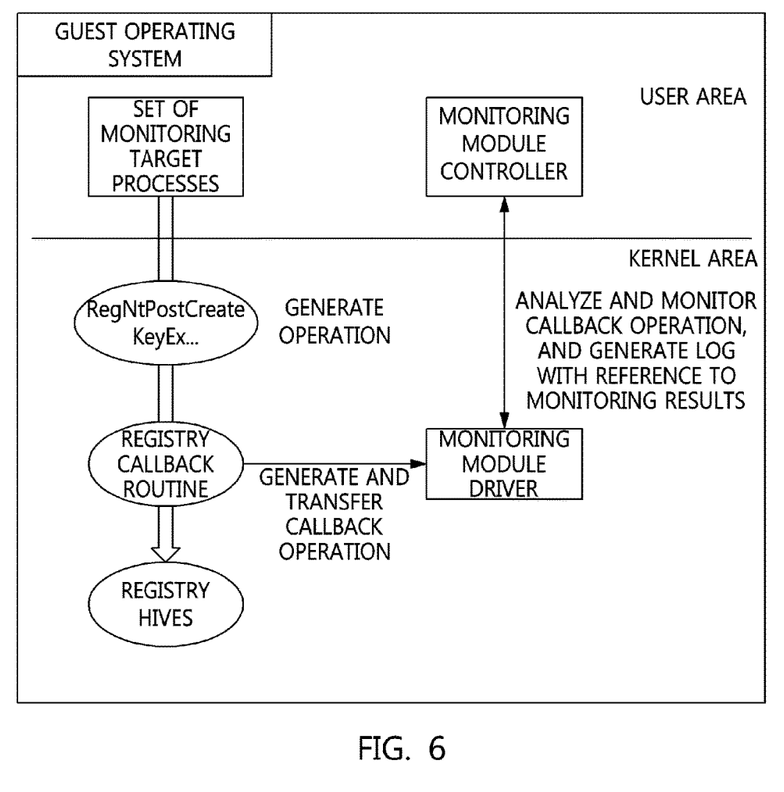
FIG. 6 is an exemplary diagram for explaining a procedure for monitoring a callback-related operation at step S330 of FIG. 3.

FIG. 6 is an exemplary diagram for explaining a procedure for monitoring a callback-related operation at step S330 of FIG. 3.

As shown in FIG. 6, when a monitoring unit (monitoring module) monitors a callback-related operation (callback operation) in a profile-only guest operating system, if a set of monitoring target processes generates an operation such as RegNtPostCreateKeyEx, the software update apparatus 100 in the virtualized environment may access registry hives and may then perform tasks specified by the corresponding operation.

Here, the registry callback routine of the guest operating system may intercept the callback operation and transfer it to a monitoring module driver. Further, the monitoring module driver may additionally transfer the received callback operation to a monitoring module controller in a user area and may analyze the parameters of the callback operation, thus creating source software profile data.

Hereinafter, the procedure in which the software update apparatus in the virtualized environment applies a software profile according to an embodiment of the present invention will be described in greater detail with reference to FIG. 7.

Figure 7:
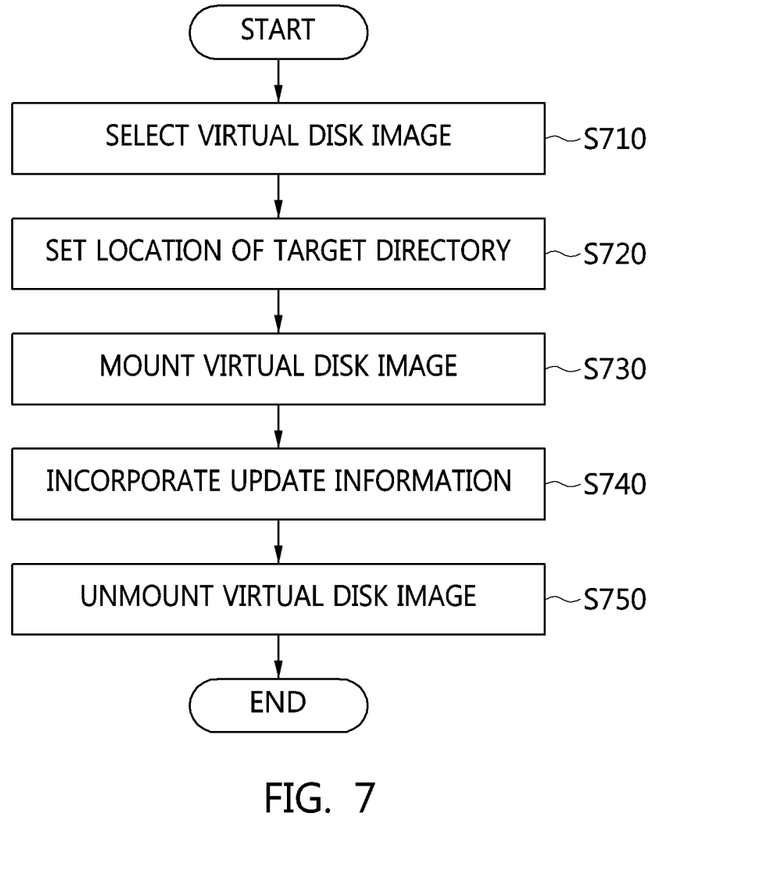
FIG. 7 is a flowchart for explaining a software profile application procedure according to an embodiment of the present invention.

FIG. 7 is a flowchart for explaining the procedure for applying a software profile according to an embodiment of the present invention.

The software update apparatus 100 in the virtualized environment performs software update by applying a software profile to a virtual disk image for a target virtual machine through the procedure of FIG. 7.

First, the software update apparatus 100 in the virtualized environment selects a virtual disk image at step S710.

The software update apparatus 100 in the virtualized environment selects a virtual disk image for a target virtual machine to which the software profile is desired to be applied.

Then, the software update apparatus 100 in the virtualized environment sets the location of a target directory at step S720.

The software update apparatus 100 in the virtualized environment designates the location of the target directory within a system in a virtual machine monitor area.

Next, the software update apparatus 100 in the virtualized environment mounts the virtual disk image at step S730.

The software update apparatus 100 in the virtualized environment mounts the virtual disk image, selected at step S710, at the location of the target directory, set at step S720. Here, the software update apparatus 100 in the virtualized environment may establish a mount path of the virtual disk image and may mount the virtual disk image to correspond to the established mount path.

Further, the software update apparatus 100 in the virtualized environment incorporates update information into the target directory at step S740.

The software update apparatus 100 in the virtualized environment performs update such as the creation, change, and deletion of a file below the target directory in which the virtual disk image is mounted by referring to the software profile.

Further, the software update apparatus 100 in the virtualized environment searches locations below the target directory for a registry file with reference to the software profile, and performs update such as the creation, change, and deletion of a registry by parsing the found registry file.

Finally, the software update apparatus 100 in the virtualized environment unmounts the virtual disk image at step S750.

The software update apparatus 100 in the virtualized environment may complete the application of the software profile by unmounting the virtual disk image.

Respective steps of the procedure for applying the software profile shown in FIG. 7 may be operated to comply with an operation mode corresponding to at least one of the state in which a virtual machine is in a deactivated state, the state immediately before the virtual machine switches from the deactivated state to an activated state, and the state in which the virtual machine is in the activated state.

Below, a software update process in a virtualized computing infrastructure environment according to an embodiment of the present invention will be described in greater detail with reference to FIG. 8.

Figure 8:
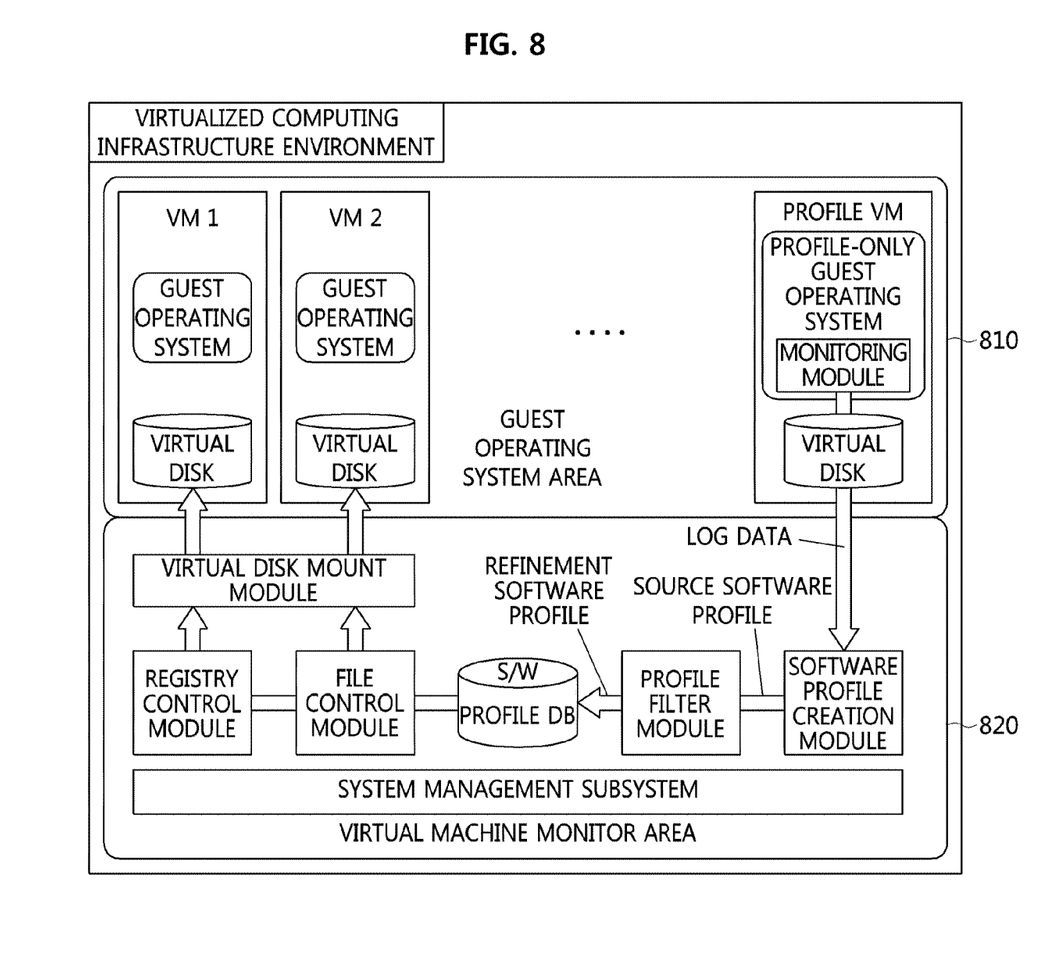
FIG. 8 is a diagram illustrating a software update process in a virtualized computing infrastructure environment according to an embodiment of the present invention.

FIG. 8 is a diagram illustrating a software update process in a virtualized computing infrastructure environment according to an embodiment of the present invention.

As shown in FIG. 8, the software update apparatus in the virtualized environment monitors the operation of a process for performing software update in a guest operating system area 810 and then generates log data required for the creation of a software profile.

Further, the software update apparatus in the virtualized environment analyzes operation monitoring details of the log data in a virtual machine monitor area 820 and creates source software profiles by extracting an actually created file and registry information. Furthermore, the software update apparatus in the virtualized environment stores a software profile created by filtering the source software profiles.

The software update apparatus in the virtualized environment mounts a virtual disk image file for a virtual machine, to which the software profile is desired to be applied, in a specific directory of a system in the virtual machine monitor area, and performs software update based on the software profile by accessing the specific directory in which the virtual disk image is mounted.

Here, the software update apparatus in the virtualized environment may perform update by incorporating update information of at least one of a file and a registry that are specified in the software profile into the specific directory. In particular, the software update apparatus in the virtualized environment may access the specific directory in which the virtual disk image is mounted, search for a registry file, and perform software update by referring to the software profile.

Here, the software update may mean a task corresponding to at least one of installation, deletion, and recovery backup creation of software or update.

Figure 9:
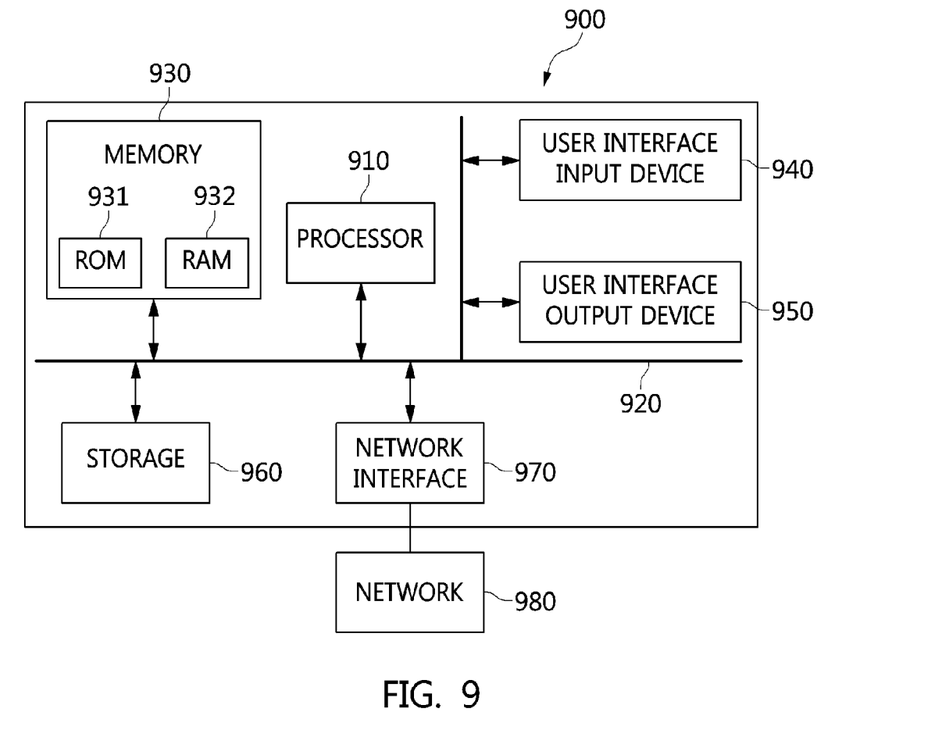
FIG. 9 is a block diagram illustrating a computer system according to an embodiment of the present invention.

FIG. 9 is a block diagram illustrating a computer system according to an embodiment of the present invention.

Referring to FIG. 9, the embodiment of the present invention may be implemented in a computer system 900, such as a computer-readable storage medium. As shown in FIG. 9, the computer system 900 may include one or more processors 910, memory 930, a user interface input device 940, a user interface output device 950, and storage 960, which communicate with each other through a bus 920. The computer system 900 may further include a network interface 970 connected to a network 980. Each of the processors 910 may be a Central Processing Unit (CPU) or a semiconductor device for executing processing instructions stored in the memory 930 or the storage 960. Each of the memory 930 and the storage 960 may be any of various types of volatile or nonvolatile storage media. For example, the memory 930 may include Read Only Memory (ROM) 931 and Random Access Memory (RAM) 932.

Therefore, the embodiment of the present invention may be implemented as a non-temporary computer-readable medium in which a computer-implemented method is recorded or in which computer-executable instructions are recorded. When the computer-executable instructions are executed by the processor, the instructions may perform the method according to at least one aspect of the present invention.

In accordance with the present invention, security vulnerabilities that may occur while software update is performed in a guest operating system may be minimized.

As described above, in the software update apparatus and method in a virtualized environment according to the present invention, the configurations and schemes in the above-described embodiments are not limitedly applied, and some or all of the above embodiments can be selectively combined and configured so that various modifications are possible.

What is claimed is:

1. A software update method in a virtualized environment, performed by a software update apparatus in a virtualized environment, the software update method comprising:
    monitoring an operation that is invoked when software is updated in a guest operating system area;
    creating a software profile by analyzing results of the monitoring;
    mounting a virtual disk image for a target virtual machine in a target directory in a virtual machine monitor area; and
    incorporating update information of at least one of a file and a registry that are specified in the software profile into the target directory in which the virtual disk image is mounted,
    wherein monitoring the operation that is invoked comprises:
    setting a monitoring target that includes at least one of a process and an operation that are targets to be monitored; and
    generating log data by monitoring invocation details of the operation that is invoked when the monitoring target updates the software, and
    wherein creating the software profile comprises:
    determining whether update of the software requires a system reboot;
    if it is determined that the update of the software requires the system reboot, setting a process that performs a pending file rename operation as the monitoring target;
    performing setting such that when the system reboots, the operation that is the monitoring target is activated, and then performing the system reboot; and
    generating the log data by monitoring invocation details of the operation.

2. The software update method of claim 1, wherein creating the software profile further comprises:
    if it is determined that the update of the software does not require the system reboot, creating source software profiles using the log data; and
    creating the software profile based on a list of the source software profiles.

3. The software update method of claim 2, wherein creating the software profile based on the list of the source software profiles is configured to create the software profile based on an extent of influence and a degree of error that are exerted and caused when the source software profiles are applied to the target virtual machine.

4. The software update method of claim 1, wherein mounting the virtual disk image in the target directory comprises:
    selecting the virtual disk image for the target virtual machine to which the software profile is to be applied;
    setting a location of the target directory in the virtual machine monitor area; and
    mounting the selected virtual disk image at the location of the target directory.

5. The software update method of claim 4, wherein incorporating the update information into the target directory comprises:
    searching locations below the target directory, in which the virtual disk image is mounted, for a registry file using the software profile;
    performing a registry update by parsing the found registry file; and
    unmounting the virtual disk image.

6. The software update method of claim 1, further comprising resetting at least one of the monitoring target, the software profile, and a location of the target directory.

7. The software update method of claim 6, wherein resetting the at least one of the monitoring target, the software profile, and the location of the target directory is configured to provide an operation mode that allows mounting the virtual disk image and incorporating the update information into the target directory to be performed in at least one of a state in which a virtual machine is in a deactivated state, a state immediately before the virtual machine switches from the deactivated state to an activated state, and a state in which the virtual machine is in the activated state.

8. The software update method of claim 1, wherein the software profile comprises one or more records that include at least one of a name of the software, a name of update, an attribute of the software profile, an identifier of a process that is a monitoring target, a name of the process, a usage time of an operation that is the monitoring target, a name of the operation, a file that is capable of being acquired by parsing parameters of the operation, a path name of the registry, results of performance of the operation, detailed parameter information of the operation, an actually created file, and information of the registry.

9. A software update apparatus in a virtualized environment, comprising:
one or more processors; and
a non-transitory computer-readable medium which has stored thereon computer-executable instructions to cause the one or more processors to perform:
a monitoring unit for monitoring an operation that is invoked when software is updated in a guest operating system area;
a software profile creation unit for creating a software profile by analyzing results of the monitoring;
a mount unit for mounting a virtual disk image for a target virtual machine in a target directory in a virtual machine monitor area; and
a file control unit for incorporating update information of at least one of a file and a registry that are specified in the software profile into the target directory in which the virtual disk image is mounted,
wherein the monitoring unit sets a monitoring target that includes at least one of a process and an operation that are targets to be monitored, and generates log data by monitoring invocation details of the operation that is invoked when the monitoring target updates the software, and
wherein the software profile creation unit is configured to:
determine whether update of the software requires a system reboot,
if it is determined that the update of the software requires the system reboot, set a process that performs a pending file rename operation as the monitoring target,
perform setting such that when the system reboots, the operation that is the monitoring target is activated, and then perform the system reboot, and
generate the log data by monitoring invocation details of the operation.

10. The software update apparatus of claim 9, wherein the software profile creation unit is configured to, if it is determined that the update of the software does not require the system reboot, create source software profiles using the log data and create the software profile based on a list of the source software profiles.

11. The software update apparatus of claim 10, wherein the software profile creation unit creates the software profile based on an extent of influence and a degree of error that are exerted and caused when the source software profiles are applied to the target virtual machine.

12. The software update apparatus of claim 9, wherein the mount unit is configured to select the virtual disk image for the target virtual machine to which the software profile is to be applied, set a location of the target directory in the virtual machine monitor area, and mount the selected virtual disk image at the location of the target directory.

13. The software update apparatus of claim 12, wherein the file control unit is configured to search locations below the target directory, in which the virtual disk image is mounted, for a registry file using the software profile, perform a registry update by parsing the found registry file, and unmount the virtual disk image.

14. The software update apparatus of claim 9, wherein the one or more processors are caused to further perform a management unit for resetting at least one of the monitoring target, the software profile, and a location of the target directory.

15. The software update apparatus of claim 14, wherein the management unit is configured to provide an operation mode that allows at least one of the mount unit and the file control unit to be operated in at least one of a state in which a virtual machine is in a deactivated state, a state immediately before the virtual machine switches from the deactivated state to an activated state, and a state in which the virtual machine is in the activated state.

16. The software update apparatus of claim 9, wherein the software profile comprises one or more records that include at least one of a name of the software, a name of update, an attribute of the software profile, an identifier of a process that is a monitoring target, a name of the process, a usage time of an operation that is the monitoring target, a name of the operation, a file that is capable of being acquired by parsing parameters of the operation, a path name of the registry, results of performance of the operation, detailed parameter information of the operation, an actually created file, and information of the registry.

\* \* \* \* \*